March 4, 1952  L. G. SUBLETT  2,587,787
AUTOMATIC WEIGHER
Filed July 19, 1949  5 Sheets-Sheet 1
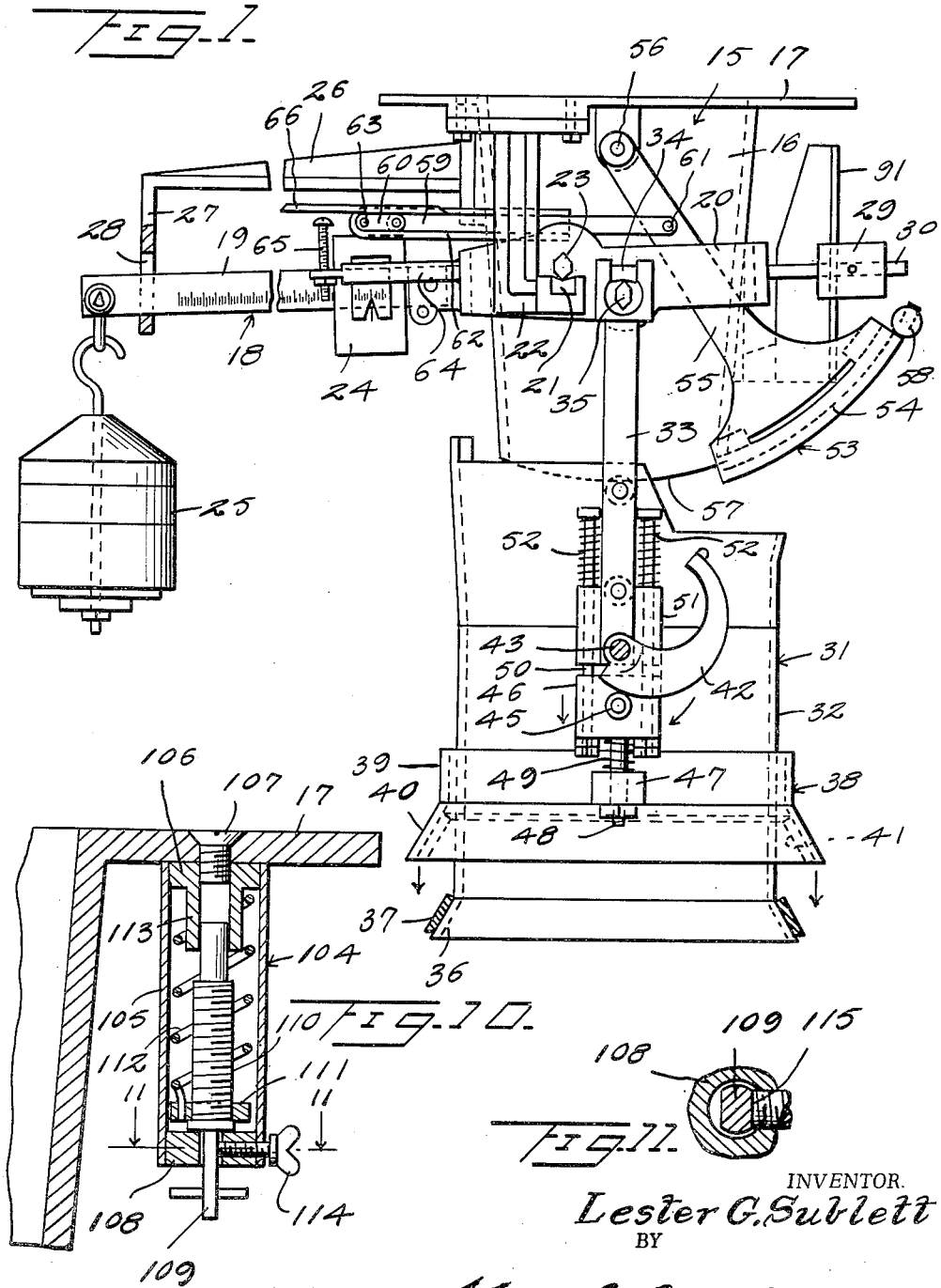
INVENTOR.
Lester G. Sublett
BY
Kimmel & Crowell ATTORNEYS

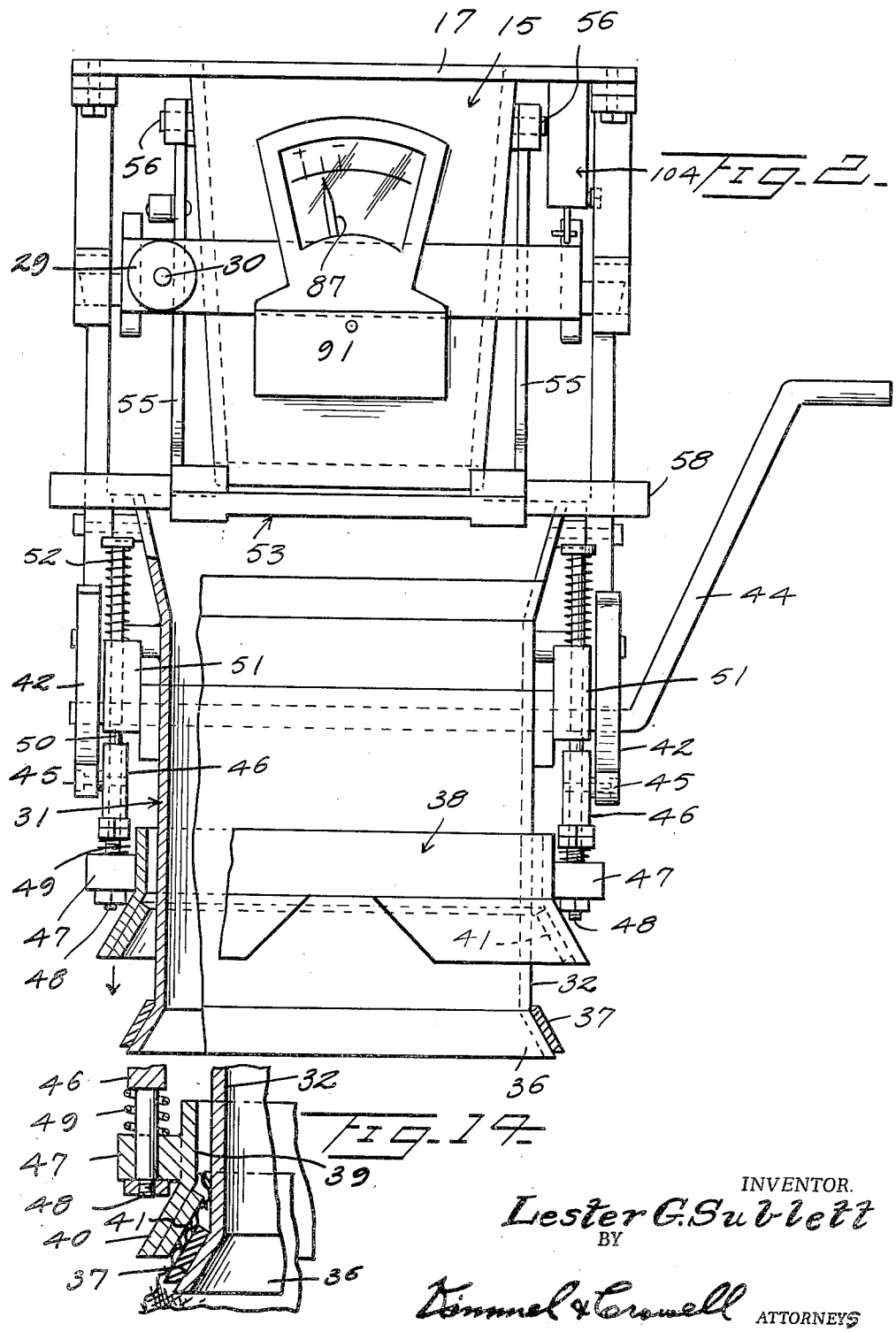

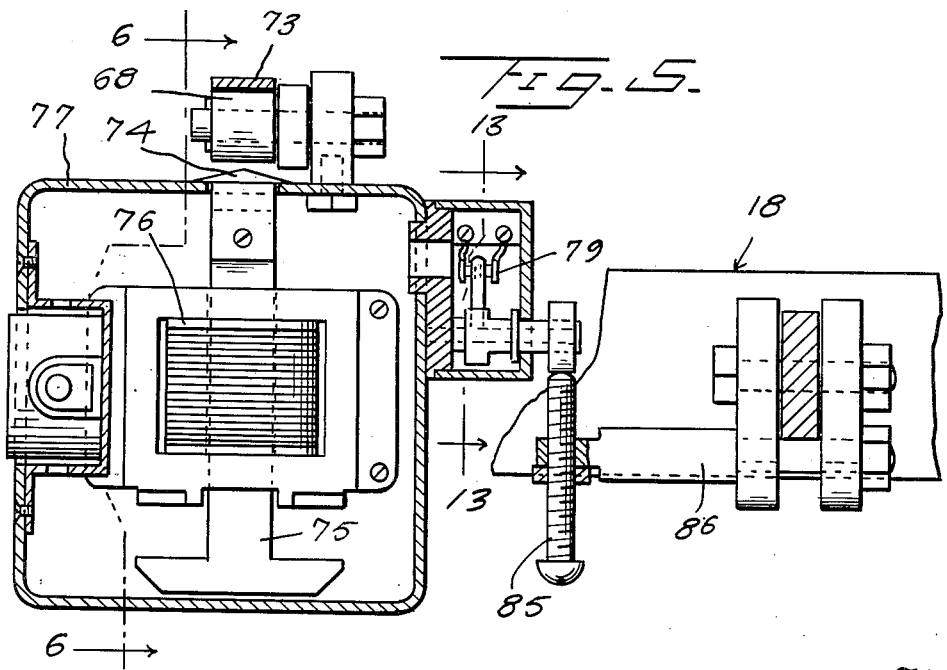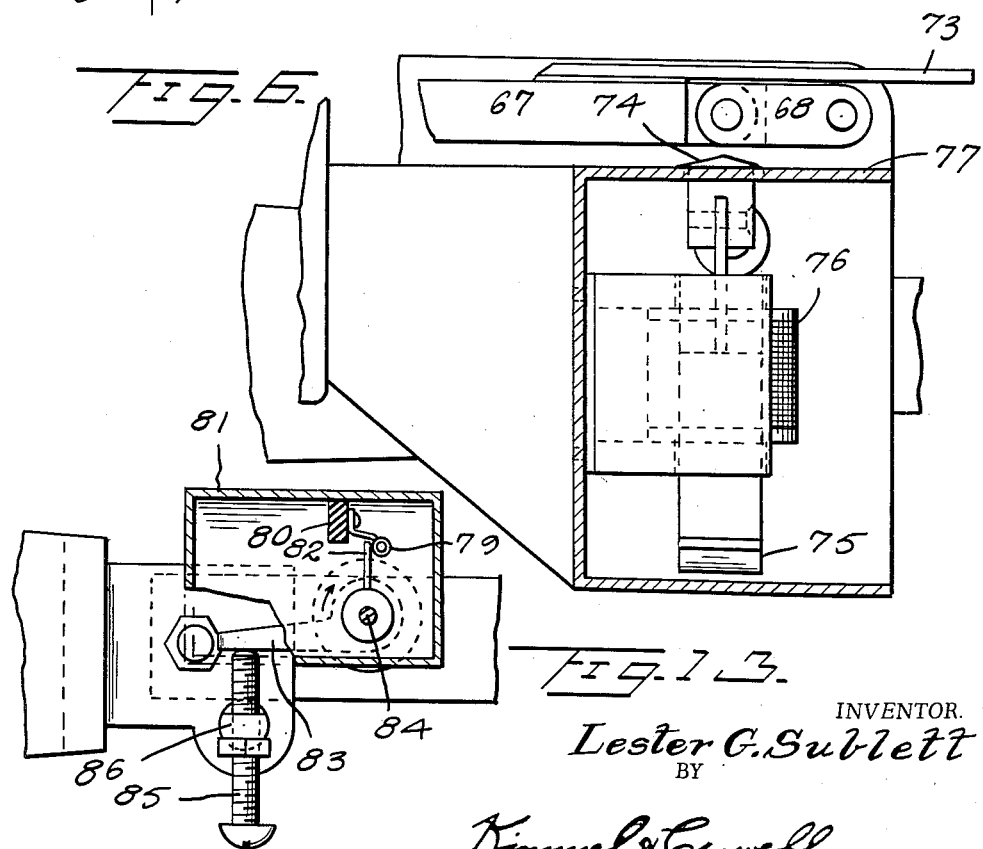

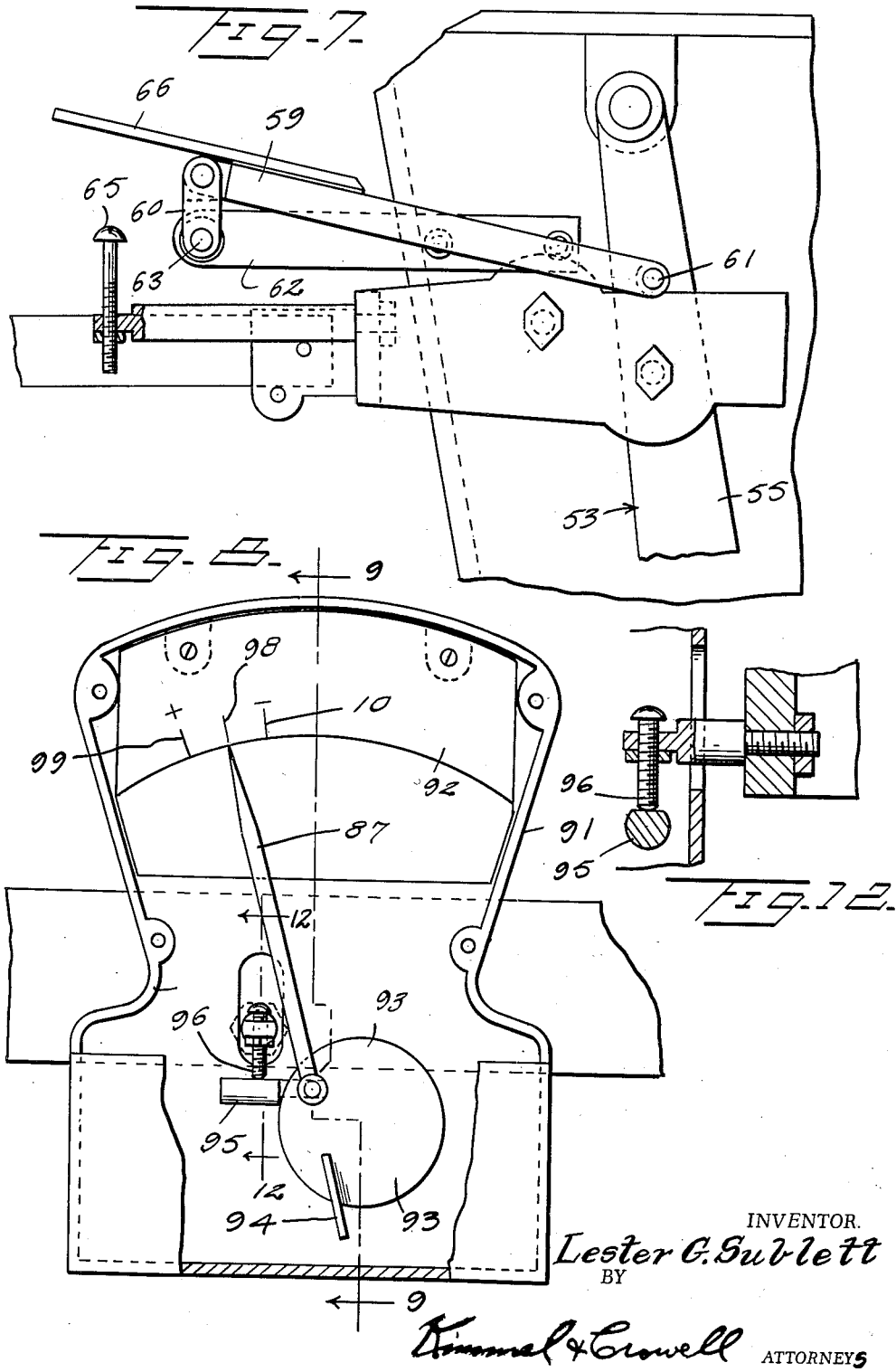

March 4, 1952  L. G. SUBLETT  2,587,787
AUTOMATIC WEIGHER
Filed July 19, 1949  5 Sheets-Sheet 5
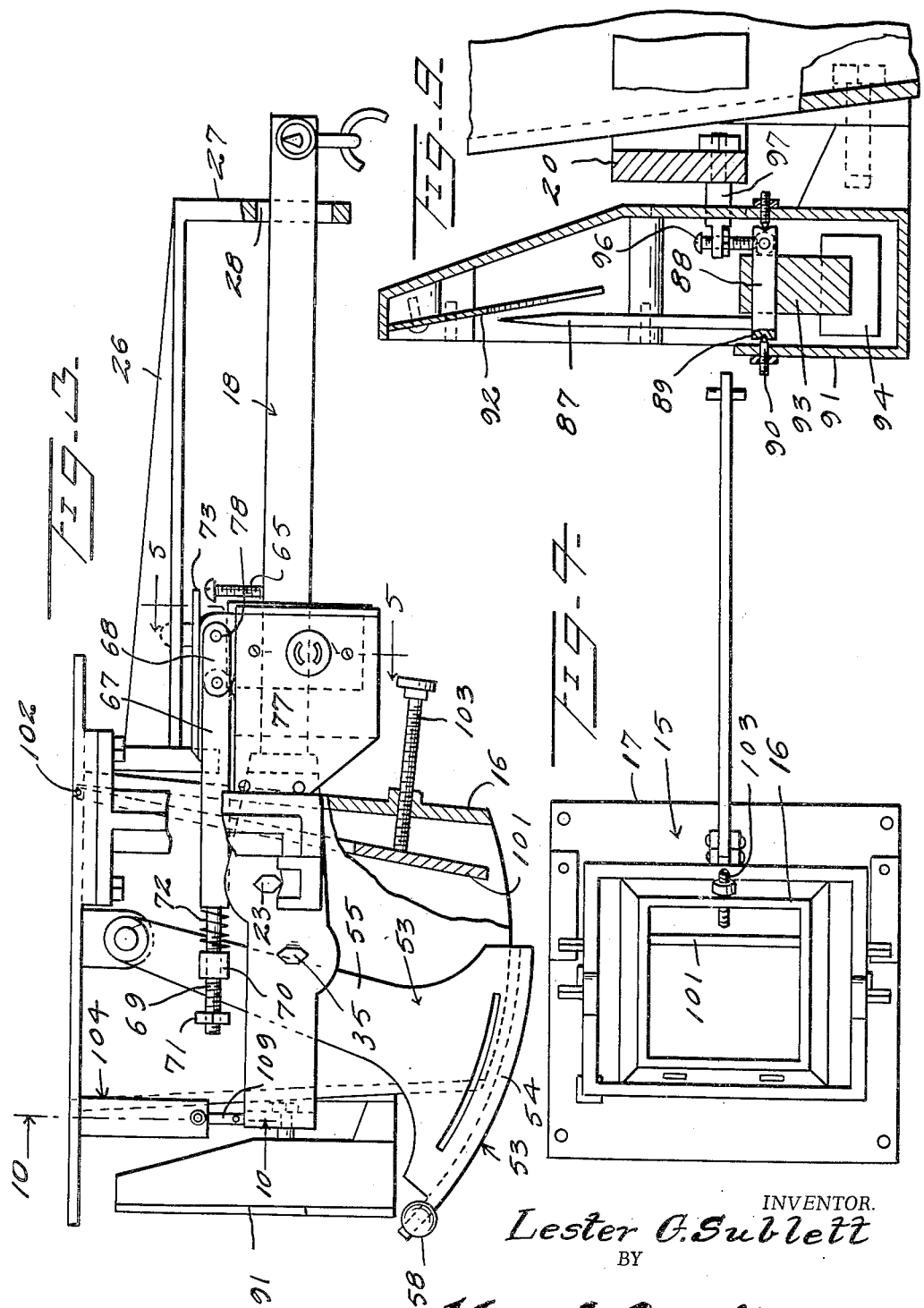
INVENTOR.
Lester G. Sublett
BY
Kimmel & Crowell  ATTORNEYS Patented Mar. 4, 1952

2,587,787

UNITED STATES PATENT OFFICE 2,587,787

AUTOMATIC WEIGHER

Lester G. Sublett, New Albany, Ind., assignor to Signal Scale and Manufacturing Company, Inc., Louisville, Ky.

Application July 19, 1949, Serial No. 105,471

1 Claim. (Cl. 249—58)

This invention relates to a bagging device for bagging measured quantities of dry material.

An object of this invention is to provide a bagging device which is automatically operable to provide for cutting off the flow of material from the hopper to the receiving bag, the device including an indicating scale which will accurately indicate the quantity of material discharged into the bag. The device embodied in this invention includes a balance scale and a pointer swingable across a scale which will accurately show the over or under amounts discharged.

Another object of this invention is to provide an improved gravity closing gate valve on the bottom of the hopper, which is latched in open position, and is released for movement to partly closed position by the balance beam at the time the beam nears its balanced position, and is finally released for movement to completely closed position when the bag is filled.

A further object of this invention is to provide in a device of this kind a pivoted wall or plate in the throat of the hopper so that the flow of material may be restricted to the desired degree.

A further object of this invention is to provide a bag filling means which provides for the rapid filling of the major portion of the bag, and for restricting the flow of material as the bag nears the filled point, with a complete cutting off of the flow of material when the bag is completely filled.

A further object of this invention is to provide in a device of this kind an improved bag clamping means whereby the bag may be suspendingly held beneath the hopper.

With the above and other objects in view, my invention consists in the arrangement, combination and details of construction disclosed in the drawings and specification, and then more particularly pointed out in the appended claim.

In the drawings,

Figure 1 is a detail side elevation, partly broken away and in section, of a bag filling and weighing device constructed according to an embodiment of this invention, Figure 2 is a detail rear elevation of the device, partly broken away and in section, Figure 3 is a detail side elevation, party broken away and in section, showing the side of the device opposite from Figure 1, and with the bag supporting means removed, Figure 4 is a bottom plan view of Figure 3, Figure 5 is a fragmentary sectional view taken on the line 5—5 of Figure 3, Figure 6 is a fragmentary sectional view taken on the line 6—6 of Figure 5, Figure 7 is a fragmentary side elevation of the device as viewed in Figure 1, showing the gravity operated gate in partly closed position, Figure 8 is a detail rear elevation, partly broken away, showing the indicator associated with this device, Figure 9 is a sectional view taken on the line 9—9 of Figure 8, Figure 10 is a fragmentary sectional view taken on the line 10—10 of Figure 3, Figure 11 is a fragmentary sectional view taken on the line 11—11 of Figure 10, Figure 12 is a fragmentary sectional view taken on the line 12—12 of Figure 8, Figure 13 is a fragmentary sectional view taken on the line 13—13 of Figure 5, Figure 14 is a fragmentary sectional view showing the bag clamping means in clamping position.

Referring to the drawings, the numeral 15 designates generally the discharge throat of a hopper adapted to contain granular, powdered or other material which is to be bagged in regulated and predetermined amounts. The hopper throat 15 includes a downwardly tapering polygonal body 16 having a flange 17 at the upper end thereof for securing to the lower end of a hopper.

A scale beam generally designated as 18 is pivotally carried by the body 16 and includes an elongated graduated bar 19 which is secured to a yoke 20. The yoke 20 is rockably supported by means of a pair of bearings 21 which are carried by bearing supporting bracket arms 22, dependently carried by the flange 17. The yoke 20 includes a pair of outwardly extending knife-like trunnions 23, engageable with the bearings 21.

The scale member 19 has slidable along the length thereof a balance weight 24, and the outer end of the bar 19 is adapted to have secured thereto weights 25. A rigid bar 26 is disposed above the bar 19, being fixed at its inner end to the upper portion of the body 16, and the bar 26 includes a downwardly extending arm 27 formed with an opening 28 through which the bar 19 loosely engages.

A balance weight 29 is mounted on a rearwardly projecting rod 30 which is carried by the yoke 20 so that the beam 18 may be very finely balanced to provide for the accurate weighing of the material which is being bagged.

A bag supporting means generally designated as 31 is dependently carried by the yoke 20 rearwardly from the trunnions 23. The bag supporting means 31 includes a tubular member 32 which is open at its upper and lower ends, and has secured thereto a pair of supporting bars 33 which have bearings 34 at their upper ends engaging knife-like trunnions 35 carried by the sides of the yoke 20.

The tubular member 32 is formed at its lower end with a flared clamping portion 36 on which a rubber ring 37 is secured. A vertically adjustable bag clamping member generally designated as 38 is movably carried by the body 32 and includes a sleeve 39 formed with a flared clamping member 40 at its lower end, having secured on the inner side thereof a rubber or compressible gasket 41 which cooperates with the gasket or ring 37 in clamping the neck or upper end of a bag B tightly with respect to the bag supporting member 31. The adjustable bag clamping member 38 is movable downwardly to clamping position by means of a pair of cams 42 which are secured to a cam shaft 43 journalled across the tubular body 32. A crank 44 is carried by the shaft 43 so that the cam 42 may be rocked clockwise, as viewed in Figure 1, to bag clamping position.

Each cam 42 engages a roller 45 which is carried by a vertically movable block 46, and the clamping member 38 is formed with a pair of outwardly extending ears 47 through which bolts 48 extend. The bolts 48 are fixed relative to the ears 47 and are slidable in the blocks 46, being constantly urged downwardly by means of a spring 49 which engages about the bolt 48 above the ear 47. The block 46 has fixed thereto a pair of slide rods 50 which are slidable in a block 51 fixed relative to the tubular member 32, and a spring 52 engages about each slide rod 50 and constantly urges the block 46 with the clamping member 38 upwardly to a released position.

The amount of material which is passed through the body 16 to the bag B clamped to the bag supporting member 31 is regulated by means of a gravity operated gate generally designated as 53. The gate 53 includes a transversely arcuate valve plate 54 which has secured thereto a pair of supporting arms 55 pivotally secured on pivots 56 carried by the upper portion of the throat 15. The lower end of the body 16 is cut on a convex curve, as indicated at 57, so that the valve plate 54 will thoroughly close the lower end of the body 16 when the valve member 54 is in its closed position. The gate 53 is adapted to be moved to a full open position by means of a pair of handles 58 which are secured to the rear portion of the gate 53.

In order to provide a means whereby the gate 53 will be held in its full open position during the initial discharge of material into the bag B, I have provided a releasable gate locking means which includes a pair of pivotally connected links 59 and 60. Link 59 is a relatively long link and is pivotally connected at its rear end to an arm 55 on a pivot 61. A forwardly extending bar 62 is carried by the throat 15 and the short link 60 is pivotally connected as at 63 to the bar 62. A releasing means for releasing the lock between the two links 59 and 60 when the latter are in aligned position includes a forwardly extending arm 64 which is fixed to the yoke 20 and also includes an upwardly extending adjustable bolt 65.

A forwardly extending arm 66 is fixed to the link 59 and is adapted to be positioned over the top of the bolt 65. The arm 66 is adapted to overlie the upper edge of link 60 when gate 53 is in its full open position, whereas when beam 18 swings upwardly by reason of the weight of material discharged into the bag B, bolt 65 will strike arm 66 thereby breaking the lock between links 59 and 60 and causing link 60 to swing upwardly as shown in Figure 7. In practice bolt 65 will initiate the upward swinging of link 60 and the final swinging of this link to a substantially vertical position will be effected by weight of the gate 53.

In order to provide a means whereby the material will not be completely cut off by the gate 53 and so that the bag may be only partially filled when the gate 53 is in its open position and will be finally filled by a small dribble or stream of material, I have provided a second beam locking means which is disposed on the opposite side of the throat 15 from the locking means including the links 59 and 60. The gate 53 is held in partly open position by means of a pair of releasable locking links 67 and 68. Link 67 is a relatively long link and has secured to the rear end thereof a rod 69 which slidably engages through a bushing 70 pivotally carried by the adjacent valve supporting arm 55 of the gate 53. A nut 71 is threaded on the rod 69 rearwardly of the bushing 70 and a spring 72 is interposed between the bushing 70 and the adjacent or rear end of the link 67. The spring 72 is designed to cushion the forward swinging of the gate 53 from its completely open position to the final filling position shown in Figure 3. At the time the gate 53 is in the final bag filling position shown in Figure 3, the balance beam 18 will be disposed in a position slightly out of horizontal, being inclined downwardly and forwardly. As the bag reaches its completely filled condition, beam 18 will swing upwardly to a horizontal position and at this time the lock between the links 67 and 68 which is retained by a bar 73, will be broken by means of an electrically operated link releasing structure. This releasing structure includes a plunger 74 disposed beneath the joint between links 67 and 68, which is carried by a solenoid core 75.

A solenoid coil 76 is mounted in a housing 77 which is fixedly carried by an adjacent bearing supporting bracket arm 22. The core 75 when the coil 76 is energized, will be drawn upwardly so that plunger 74 will strike the joint between the links 67 and 68, forcing these links to swing upwardly. Link 68 is pivotally secured as at 78, to the upper side of the housing 77 so that when the links 67 and 68 are pushed upwardly by plunger 74, gate 53 will be moved forwardly to a completely closed position.

Solenoid coil 76 is energized to provide for the complete closing of gate 53 by means of a switch structure, which includes a pair of spaced contacts 79 carried by an insulating block 80 fixed in the switch housing 81. A bridging contact 82 is disposed in angular relation to a contact operating lever 83 pivotally carried as at 84, by the housing 81, and bridging contact 82 is moved to contacting relation with the spaced contacts 79 by means of an adjustable bolt 85 which is carried by an arm 86. The arm 86 is fixed to one side of the beam 18, as shown in Figure 5, so that when beam 18 reaches a horizontal position the electric circuit to coil 76 will be completed and plunger 74 will be moved upwardly to a gate releasing position.

The exact amount of material which is discharged into the bag is indicated by an indicating means, including a swinging pointer 87 which is secured to a shaft 88, having tapered sockets 89 in the opposite ends thereof, within which pointed pinions 90 are adapted to engage. A housing 91 encloses the pointer 87 and carries the pinions 90 and the pointer 87 is movable across a scale 92 which is carried by the housing 91.

A weight 93 is fixed eccentrically to the shaft 88 and the weight 93 has secured thereto a second weight 94. An arm 95 is fixed to the weight 93 and is disposed in a position to be engaged by a screw or bolt 96 which extends through a rearwardly projecting arm 97 carried by the rear of the yoke 20.

The scale 92 includes a zero indication 98, and plus and minus graduations 99 and 100 respectively. When beam 18 is in a balanced position, pointer 87 will be in alignment with zero graduation 98 but if the quantity of material discharged into the bag is greater than the exact amount to be placed in the bag, pointer 87 will swing to the left, whereas if the amount discharged into the bag is under the exact amount, pointer 87 will swing by gravity to the right, as viewed in Figure 8.

In the use and operation of this device, the throat 15 is secured to the lower end of a hopper, and balance weight 24 is adjusted along the beam bar 19 to the desired position. The open end of the bag is clamped to the bag supporting member 31 by swinging crank 44 downwardly to thereby clamp the bag between the yieldable gaskets 37 and 41. With the bag in clamped position, gate 53 is manually swung to the left by grasping handles 58, to a fully open position. In this latter position links 59 and 60 will be in locked position and links 67 and 68 will also be in locked position. The material will rapidly be discharged during the initial filling operation, into the bag supporting member 31 and the bag. After the bag has been filled to substantially 85% of its capacity, beam 18 will be rocked upwardly at its forward end by weight of the material in the bag, thereby breaking the lock between links 59 and 60. Gate 53 will gravitatingly swing downwardly and forwardly to a partly closed position which is determined by the links 67 and 68 and spring 72.

As shown in Figure 3, an inner wall 101 is disposed in the throat 15, being pivoted at its upper end as at 102 and adjustable inwardly to restrict the flow of material by means of an adjusting threaded screw 103 extending through the body 16. With gate 53 in its partly closed position, as shown in Figure 3, the flow of the material to bag supporting member 31 and to the bag will be substantially restricted until beam 18 rises upwardly to a horizontal position. At the time beam 18 is in a horizontal position, switch contact bridging member 82 will bridge contacts 79 to energize solenoid coil 76 and effect upward movement of plunger 74 to break the lock between links 67 and 68.

A trim gauge generally designated as 104 is carried by the flange 17 in dependent relation and is disposed in the path of the upward swinging of the rear portion of yoke 20. The trim gauge 104 includes a housing 105 having an upper head 106 which is secured to the flange 17 by a bolt or screw 107. The housing 105 also includes a lower head 108 through which a shaft 109 slidably engages. Te shaft 109 is carried by a plunger 110 slidable in the housing 105 and having threaded on the periphery thereof a spring tensioning nut 111. A spring 112 engages about the plunger 110 in the housing 105 and bears at its upper end against the head 106 which is formed with a reduced diameter extension and plunger guide 113. The shaft 109 and the plunger 110 are held against rotation by means of a screw 114 threaded through the head 108 and engaging a flat side 115 formed on the shaft 109. The shaft 109 is adapter at its lower end to bear against the upper side of yoke 20 adjacent the rear thereof. The trim gauge is designed to prevent undue oscillation or rocking of beam 18 and may be so adjusted that the outer end of beam 18 will be held against engagement with the lower end of opening 28 in arm 27.

I do not mean to confine myself to the exact details of construction herein disclosed, but claim all variations falling within the purview of the appended claim.

What I claim is:

A bagging scale comprising a hopper throat for securing to the discharge end of a hopper, a gravity closing valve at the lower end of said throat, a horizontally disposed bar fixed relative to said throat, a pair of pivotally connected links connected between said valve and said bar, a solenoid housing fixed relative to said throat, a second pair of pivotally connected links, means pivotally securing one of said second named pair of links to said housing, a slide bar extending from the other of said second named pair of links, a guide for said bar carried by said valve, a spring interposed between said guide and the adjacent end of said other link, said spring holding said valve in partly open position when said first named links are broken, a balance beam rockably carried by said throat, a release member carried by said beam engageable with the joint between said first named pair of links to move the latter to valve released position when said beam is substantially horizontal, said spring holding said valve in partly open position, a solenoid in said housing having the core thereof confronting the connection between said second pair of links, a switch connected with said solenoid, and a switch operator carried by said beam for closing said switch when said beam is in balanced position whereby the core of said solenoid will move said second pair of links to valve released position and said valve will move to completely closed position.

LESTER G. SUBLETT.

REFERENCES CITED

The following references are of record in the file of this patent:

UNITED STATES PATENTS

| Number | Name | Date |
|---|---|---|
| 273,528 | Hibbs | Mar. 6, 1883 |
| 615,493 | Richards | Dec. 6, 1898 |
| 879,336 | Steenken | Feb. 18, 1908 |
| 984,537 | Buschman | Feb. 21, 1911 |
| 1,074,611 | Edtbauer | Oct. 7, 1913 |
| 1,269,360 | Zanone | June 11, 1918 |
| 1,274,521 | Dotterer | Aug. 6, 1918 |
| 1,822,747 | Richardson | Sept. 8, 1931 |
| 1,941,849 | Myers | Jan. 2, 1934 |
| 2,044,017 | Robb | June 16, 1936 |
| 2,058,775 | Cundall | Oct. 27, 1936 |
| 2,068,255 | Woodland | Jan. 19, 1937 |
| 2,071,443 | Weckerly | Feb. 23, 1937 |
| 2,073,445 | De Longh | Mar. 9, 1937 |
| 2,089,526 | Andreas | Aug. 10, 1937 |
| 2,260,718 | Merrifield | Oct. 28, 1941 |
| 2,318,156 | Hannah | May 4, 1943 |

FOREIGN PATENTS

| Number | Country | Date |
|---|---|---|
| 618,263 | Great Britain | Feb. 18, 1949 |